United States Patent
Harknett et al.

(10) Patent No.: US 10,856,381 B2
(45) Date of Patent: Dec. 1, 2020

(54) POWER DELIVERY SYSTEM FOR A LIGHT TOWER

(71) Applicant: CLARK EQUIPMENT COMPANY, Statesville, NC (US)

(72) Inventors: Nicholas Harknett, Statesville, NC (US); Robert Ranker, Statesville, NC (US)

(73) Assignee: Clark Equipment Company, Statesville, NC (US)

( * ) Notice: Subject to any disclaimer, the term of this patent is extended or adjusted under 35 U.S.C. 154(b) by 140 days.

(21) Appl. No.: 15/947,440

(22) Filed: Apr. 6, 2018

(65) Prior Publication Data

US 2019/0309915 A1   Oct. 10, 2019

(51) Int. Cl.
*H05B 45/14* (2020.01)
*H02K 11/00* (2016.01)
(Continued)

(52) U.S. Cl.
CPC .............. *H05B 45/14* (2020.01); *F21L 13/00* (2013.01); *F21S 9/04* (2013.01); *F21V 23/009* (2013.01);
(Continued)

(58) Field of Classification Search
CPC ......... H05B 45/14; H05B 41/16; F21L 13/00; F21S 9/04; F21V 23/009; F21V 23/023;
(Continued)

(56) References Cited

U.S. PATENT DOCUMENTS

| 5,294,879 A | 3/1994 | Freeman et al. |
| 5,808,450 A * | 9/1998 | Chula ................... H02K 11/33 322/22 |
| 2018/0266637 A1* | 9/2018 | Curlett ................ H01M 10/615 |

FOREIGN PATENT DOCUMENTS

| AU | 2011100774 A4 | 8/2011 |
| AU | 2013100095 A4 | 3/2013 |

OTHER PUBLICATIONS

International Written Opinion of the International Search Authority dated May 27, 2019 for corresponding International Application No. PCT/US2019/024122 (9 pages).
(Continued)

*Primary Examiner* — Cara E Rakowski
*Assistant Examiner* — Jessica M Apenteng
(74) *Attorney, Agent, or Firm* — Michael Best & Friedrich LLP

(57) ABSTRACT

A light tower includes a generator assembly including a prime mover, an alternator operably connected to the prime mover, the alternator configured to produce alternating current electrical energy, and a rectifier operably connected to the alternator and configured to convert alternating current electrical energy produced by the alternator to direct current electrical energy. At least one light emitting diode matrix is electrically connected to the generator assembly by an electrical connection, and a regulator is operably connected to the alternator and configured to detect a current of the direct current electrical energy in the electrical connection. In response to a detected current of the direct current electrical energy in the electrical connection, the regulator controls the alternator to adjust the current supplied to the at least one light emitting diode matrix.

14 Claims, 2 Drawing Sheets

(51) Int. Cl.
| | |
|---|---|
| *H05B 41/16* | (2006.01) |
| *F21V 23/00* | (2015.01) |
| *F21V 23/02* | (2006.01) |
| *F21L 13/00* | (2006.01) |
| *H02P 9/00* | (2006.01) |
| *F21S 9/04* | (2006.01) |
| *F21Y 115/10* | (2016.01) |
| *F21W 131/10* | (2006.01) |

(52) U.S. Cl.
CPC ........ *F21V 23/023* (2013.01); *H02K 11/0094* (2013.01); *H02P 9/00* (2013.01); *H05B 41/16* (2013.01); *F21W 2131/10* (2013.01); *F21Y 2115/10* (2016.08)

(58) Field of Classification Search
CPC ... H02K 11/0094; H02P 9/00; F21Y 2115/10; F21W 2131/10
USPC ........................................................ 362/192
See application file for complete search history.

(56) References Cited

OTHER PUBLICATIONS

International Search Report dated May 27, 2019 for corresponding International Application No. PCT/US2019/024122 (9 pages).
International Preliminary Report on Patentability dated Oct. 15, 2020 for corresponding International Application No. PCT/2019/024122 (9 pages).

\* cited by examiner

POWER DELIVERY SYSTEM FOR A LIGHT TOWER

FIELD OF THE DISCLOSURE

The present disclosure relates to a light tower. More specifically, the disclosure relates to a light tower that incorporates light emitting diodes (LEDs) as a light source. A control system provides a current control to limit the maximum direct current electrical energy to power the light source.

BACKGROUND

A light tower is generally known in the art. A light tower is a mobile light emitting device that can be powered by a standalone power generator, such as a diesel engine and associated alternator. Known light towers generally use metal halide lamps and/or ballasts that can be powered using alternating current (AC) electrical energy. AC electrical energy is generally voltage controlled.

Light emitting diodes can be incorporated into a light tower in place of known metal halide lamps and/or ballasts. However, light emitting diodes have certain operational requirements that make their use undesirable. Notably, light emitting diodes require a current controlled source of electrical energy. Since known light towers do not produce a constant current electrical energy, light emitting diodes require an external power conditioning unit and associated power conditioning circuitry to achieve the constant current demand. Unfortunately, the external power conditioning unit and associated power conditioning circuitry results in undesirable additional complexity and cost for a light tower.

SUMMARY

In one embodiment, the invention provides a light tower that includes a generator assembly including a prime mover, an alternator operably connected to the prime mover, the alternator configured to produce alternating current electrical energy, and a rectifier operably connected to the alternator and configured to convert alternating current electrical energy produced by the alternator to direct current electrical energy. At least one light emitting diode matrix is electrically connected to the generator assembly by an electrical connection, and a regulator is operably connected to the alternator and configured to detect a current of the direct current electrical energy in the electrical connection. In response to a detected current of the direct current electrical energy in the electrical connection, the regulator controls the alternator to adjust the current supplied to the at least one light emitting diode matrix.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
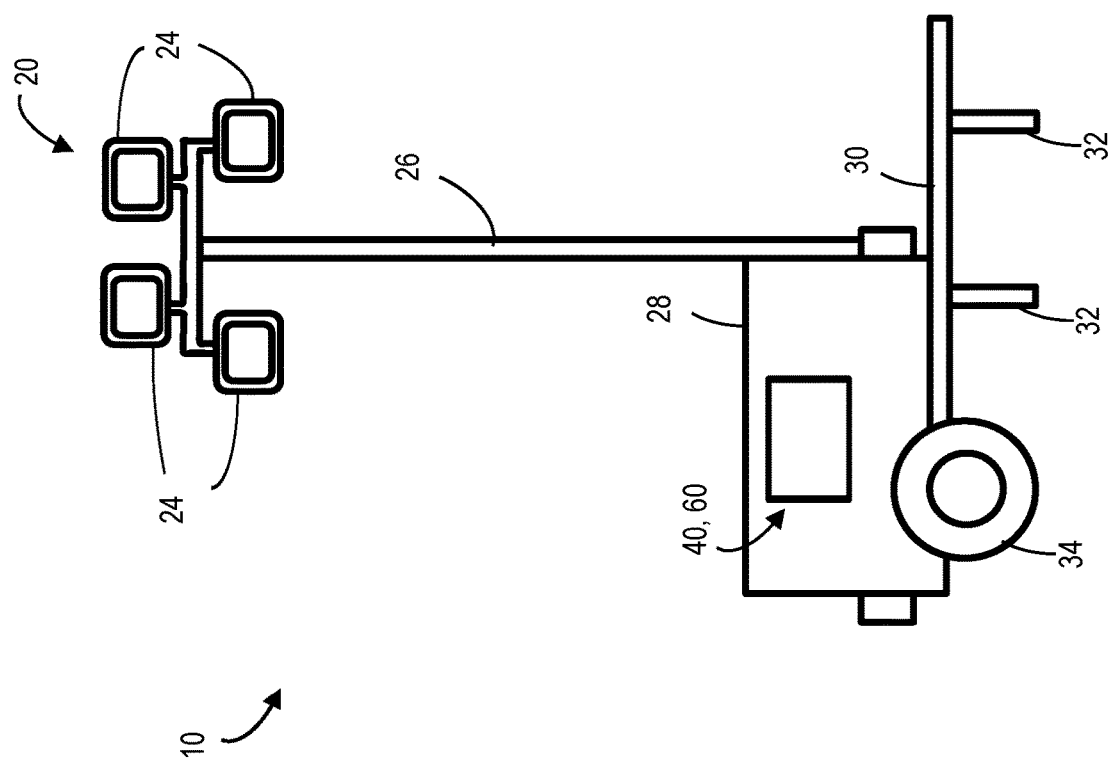
FIG. 1 is a perspective view of an embodiment of a light tower that incorporates light emitting diodes (LEDs).

FIG. 1 illustrates a perspective view of an embodiment of a light tower 10. The light tower 10 includes a light source 20. The light source 20 is defined by a plurality of light emitting diodes (LEDs). More specifically, the light source 20 includes a plurality of LED matrices 24, each of which is defined by a plurality of LEDs that are configured to emit light. The LEDs incorporated into LED matrices for light towers generally include high intensity LEDs. In the illustrated embodiment, the light source 20 includes four LED matrices 24. However, in other embodiments, the light source 20 can include any number of LED matrices 24.

The light source 20 is coupled to a support post 26. More specifically, the light source 20 is coupled at (or near) a first end of the support post 26. A second, opposite end of the support post 26 is coupled to an enclosure 28. The support post 26 can be an adjustable support. For example, the support post 26 can telescope to different lengths to position the light source 20 at a desired height above the enclosure 28. In other embodiments, the support post 26 can be extendable and retractable to allow for selective positioning and adjustment of the light source 20. The support post 26 can also be movably coupled to the enclosure 28. For example, the support post 26 can pivot relative to the enclosure 28 from the deployed position (shown in FIG. 1) to a retracted position (not shown). The support post 26 can be transitioned to the retracted (or stored) position during repositioning or storage of the light tower 10. In other embodiments, the support post 26 can be coupled to (or movably coupled to) a frame 30.

The enclosure 28 is mounted to the frame 30, such that the frame 30 carries the enclosure 28. The frame 30 can include a plurality of supports 32 and a plurality of wheels 34. The wheels 34 facilitate movement of the light tower 10 (e.g., the light tower can be towed to a desired position, etc.). The supports 32 provide structural support to the frame 30 and associated components in the deployed position (e.g., during light tower 10 operation). The enclosure 28 houses a generator assembly 40 and a control system 60.

Figure 2:
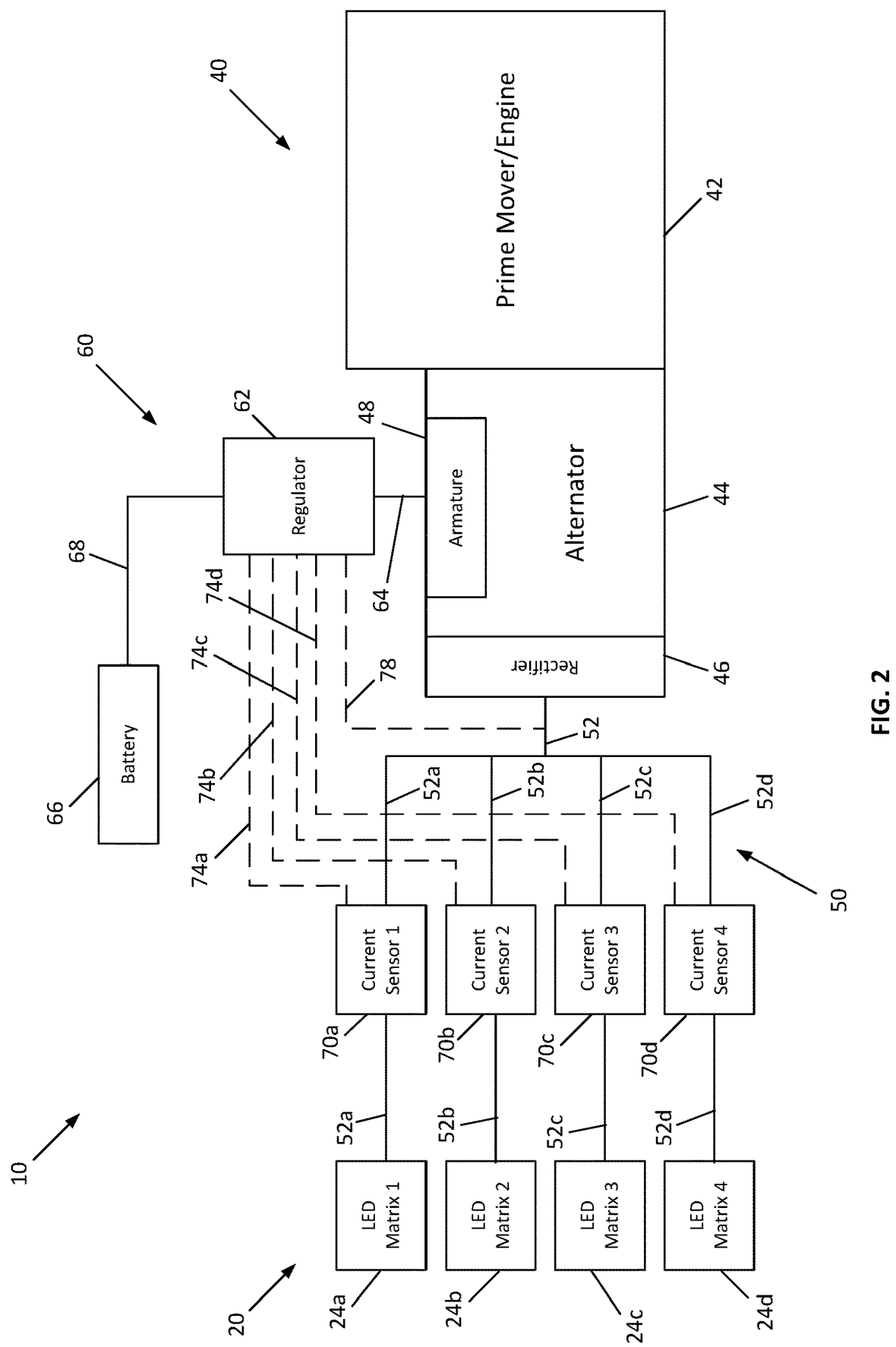
FIG. 2 is a schematic view of a generator assembly and associated control system of the LED light tower of FIG. 1.

With reference now to FIG. 2, the generator assembly 40 includes a prime mover 42, an alternator 44, and a rectifier 46. In the illustrated embodiment, the prime mover 42 is a diesel engine 42. In other embodiments, the prime mover 42 can be any suitable motor or engine (e.g., an electric motor, a natural gas motor, etc.). The prime mover 42 has a rotatable output that is operably connected to the alternator 44. The alternator 44 is a claw-pole rotor generator, and is also referred to as a Lundell generator. The alternator 44 can include a rotor (such as a claw-pole rotor, not shown), a stator (or a stator assembly, not shown), and an armature 48. The alternator 44 is driven by the prime mover 42. For example, the alternator 44 can be driven by a belt (or a belt transmission, not shown). In other embodiments, the alternator 44 can be directly driven by the prime mover 42 (e.g., by a drive shaft, etc.). The rectifier 46 is operably connected to the alternator 44. The alternator 44 generates AC electrical energy, which is received by the rectifier 46. The rectifier 46 converts the AC electrical energy to direct current (DC) electrical energy to power the light source 20.

An electricity distribution network 50 communicates the direct current electrical energy from the generator assembly 40 to the light source 20. The electricity distribution network 50 includes an electrical connection 52, such as a power cable, cord, wiring, or other conductor suitable for supplying (or transmitting) electrical energy from the generator assembly 40 to the light source 20. The electrical connection 52 is divided into a plurality of connections 52, with each connection 52 associated with a separate LED matrix 24. As illustrated in FIG. 2, the example of the light source 20 includes four LED matrices 24a-d. As such, the electrical connection 52 includes a first electrical connection 52a coupled to a first LED matrix 24a, a second electrical connection 52b coupled to a second LED matrix 24b, a third electrical connection 52c coupled to a third LED matrix 24c, and a fourth electrical connection 52d coupled to a fourth LED matrix 24d. The electrical connections 52a-d supply DC electrical energy from the generator assembly 40, and more specifically the rectifier 46, to each associated LED matrix 24a-d. In various embodiments, the electrical connection 52 can be divided into any suitable number of connections 52 based on the number of LED matrices 24. For example, in embodiments of the light source 20 that includes a single LED matrix 24, two, three, five, or six or more LED matrices 24, the electrical connection 52 can be a single connection 52, or divided into two, three, five, or six or more connections 52 based on the number of LED matrices 24. Stated another way, an N number of LED matrices 24 can include an N number of electrical connections 52, with each electrical connection 52 associated with one LED matrix 24.

The control system 60 (or current control system 60) is operably connected to the generator assembly 40 and the light source 20. The control system 60 regulates the alternator 44 of the generator assembly 40 to limit the maximum amount of DC electrical energy provided to the light source. The control system 60 can be tuned to provide an acceptable current to the LED matrices 24 without exceeding a maximum acceptable current rating, which would reduce LED life expectancy.

The control system 60 includes a regulator 62. The regulator 62 is operably coupled to the armature 48 by a first connection 64. The regulator 62 is also operably coupled to a battery 66 by a second connection 68. When there is no detected load on the alternator, the regulator 62 regulates the voltage produced by the alternator. The regulator 62 is also in communication with at least one current sensor 70. A current sensor 70 is associated with each electrical connection 52 to detect the electrical current being supplied by the alternator 44 to each associated LED matrix 24, which determines the overall load on the alternator. In the illustrated embodiment, a first current sensor 70a is positioned in the first electrical connection 52a downstream of the generator assembly 40 and upstream of the first LED matrix 24a. A second current sensor 70b is positioned in the second electrical connection 52b downstream of the generator assembly 40 and upstream of the second LED matrix 24b. A third current sensor 70c is positioned in the third electrical connection 52c downstream of the generator assembly 40 and upstream of the third LED matrix 24c. A fourth current sensor 70d is positioned in the fourth electrical connection 52d downstream of the generator assembly 40 and upstream of the fourth LED matrix 24d. In one embodiment, each electrical connection 52 includes a respective current sensor 70. Accordingly, embodiments with N number of electrical connections 52 can include N number of current sensors 70, with each electrical connection 52 including a current sensor 70.

Each current sensor 70 is in communication with the regulator 62 by a current communication link 74. In the embodiment illustrated in FIG. 2, the first current sensor 70a is in communication with the regulator 62 by a first current communication link 74a. Similarly, the second current sensor 70b is in communication with the regulator 62 by a second current communication link 74b, the third current sensor 70c is in communication with the regulator 62 by a third current communication link 74c, and the fourth current sensor 70d is in communication with the regulator 62 by a fourth current communication link 74d. Each current sensor 70 is generally in communication with the regulator 62 by a separate current communication link 74. Accordingly, embodiments with N number of current sensors 70 will include N number of current communication links 74, with each current sensor 70 being in communication with the regulator 62 by a separate current communication link 74.

The regulator 62 is also configured to measure voltage of the DC electrical energy in the electrical connection 52. A voltage communication link 78 connects the regulator 62 to the electrical connection 52. The voltage communication link 78 is connected to the electrical connection 52 downstream of the generator assembly 40, and upstream of the light source 20. In the embodiment illustrated in FIG. 2, the voltage communication link 78 is connected to the electrical connection 52 downstream of the rectifier 46, and upstream of the current sensors 70. In other embodiments, the voltage communication link 78 can connected to the electrical connection 52 at any suitable location or position downstream of the generator assembly 40.

In operation, the prime mover 42 powers the alternator 44 to generate the alternating current (AC) electrical energy. The rectifier 46 receives the AC electrical energy and converts it to DC electrical energy. The DC electrical energy is transmitted to each LED matrix 24 through the electrical connection 52. The LED matrices 24 require the DC electrical energy to be supplied at or below a maximum current level. To control the alternator 44 to provide current at or below the maximum current level to each LED matrix, the regulator 62 measures the current and voltage of the DC electrical energy in the electrical connection 52 and responsively controls the alternator 44. More specifically, the regulator 62 receives current information associated with the DC electrical energy in the electrical connection 52 from each current sensor 70. Each current sensor 70 is measuring the current being delivered to the LED matrices 24, which is collectively the alternator load. The regulator 62 receives the current information, and can responsively control the alternator 44 to achieve an appropriate current level (the "target current").

To control the alternator 44 to achieve the target current, the regulator 62 implements a control loop to modulate an excitation current to rotating field windings of the alternator 44. This produces a limited current output of DC electrical energy from the rectifier 46. More specifically, the regulator 62 receives voltage information associated with the DC electrical energy in the electrical connection 52 through the voltage communication link 78. In response to the detected voltage and detected current, the regulator 62 modulates the excitation current to the rotating field windings. For example, the regulator 62 can increase or decrease modulation of the excitation current to achieve the necessary target current. The regulator 62 continues to receive the current information from each current sensor 70, and the voltage information, and responsively modulates the excitation current to achieve and/or maintain the target current. In various embodiments, the target constant current can be any suitable pre-determined current level at or below a maximum acceptable current at which the LED matrices 24 can operate without being damaged. The maximum acceptable current can be any suitable current that does not exceed a maximum current rating for the LED matrices 24. Exceeding the maximum current rating for the LED matrices 24 can undesirably reduce LED life expectancy.

The generator assembly 40 and associated control system 60 advantageously eliminate the need for an external power conditioning unit that is common for LED matrices by controlling the alternator 44 to a constant current. In addition, the control system 60 advantageously allows for the use of a Lundell generator as the alternator 44. This is a more readily available and lower cost alternative than a customized alternator to provide limited DC electrical energy to one or more LED matrices.

Various additional features and advantages of the disclosure are set forth in the following claims.

What is claimed is:

1. A light tower comprising:
   a generator assembly including:
   a prime mover;
   an alternator operably connected to the prime mover, the alternator configured to produce alternating current electrical energy; and
   a rectifier operably connected to the alternator and configured to convert alternating current electrical energy produced by the alternator to direct current electrical energy;
   at least one light emitting diode matrix electrically connected to the generator assembly by an electrical connection; and
   a regulator operably connected to the alternator and configured to detect a current of the direct current electrical energy in the electrical connection,
   wherein in response to a detected current of the direct current electrical energy in the electrical connection, the regulator controls the alternator to adjust the current supplied to the at least one light emitting diode matrix to not exceed a maximum acceptable current of the at least one light emitting diode matrix.

2. The light tower of claim 1, wherein the prime mover is a diesel engine.

3. The light tower of claim 1, wherein the alternator is a Lundell alternator.

4. The light tower of claim 1, wherein the alternator is a claw-pole rotor generator.

5. The light tower of claim 1, wherein the alternator includes an armature, the regulator is operably connected to the armature.

6. The light tower of claim 5, wherein the regulator modulates an excitation current of the armature to adjust current output of the alternator.

7. The light tower of claim 6, wherein the current output is a target constant current.

8. The light tower of claim 1, further comprising a current sensor positioned in the electrical connection upstream of the at least one light emitting diode matrix and downstream of the generator assembly.

9. The light tower of claim 8, wherein the current sensor is configured to detect the current of the direct current electrical energy in the electrical connection, and communicate the detected current to the regulator.

10. The light tower of claim 1, wherein the at least one light emitting diode matrix includes a first light emitting diode matrix and a second light emitting diode matrix.

11. The light tower of claim 10, further comprising:
    a first current sensor positioned in the electrical connection upstream of the first light emitting diode matrix and downstream of the generator assembly, the first current sensor configured to detect a first current of the direct current electrical energy supplied to the first light emitting diode matrix and communicate the detected current to the regulator; and
    a second current sensor positioned in the electrical connection upstream of the second light emitting diode matrix and downstream of the generator assembly, the second current sensor configured to detect a second current of the direct current electrical energy supplied to the second light emitting diode matrix and communicate the detected current to the regulator.

12. The light tower of claim 11, wherein the regulator is configured to receive the detected first current and the detected second current, is configured to analyze the first current and second current in relation to a maximum acceptable current for the first light emitting diode matrix and the second light emitting diode matrix, and in response control the alternator to adjust the current supplied to the first light emitting diode matrix and the second light emitting diode matrix.

13. The light tower of claim 12, wherein the regulator is configured to control the alternator to adjust the current supplied to the first light emitting diode matrix and the second light emitting diode matrix to not exceed the maximum acceptable current of the first light emitting diode matrix and the second light emitting diode matrix.

14. A method of controlling a current level provided by an alternator on a light tower having a prime mover that powers the alternator to produce alternating current electrical energy; and a rectifier operably connected to the alternator and configured to convert alternating current electrical energy produced by the alternator to direct current electrical energy, the method comprising:
    provided direct current electrical energy to at least one light emitting diode matrix;
    detecting the direct current electrical energy level provided to the at least one light emitting diode matrix; and
    providing a control system that, in response to a detected level of the direct current electrical energy provided to the at least one light emitting diode matrix, controls the alternator to adjust the current supplied to the at least one light emitting diode matrix to not exceed a maximum acceptable current of the at least one light emitting diode matrix.

* * * * *